UNITED STATES PATENT OFFICE.

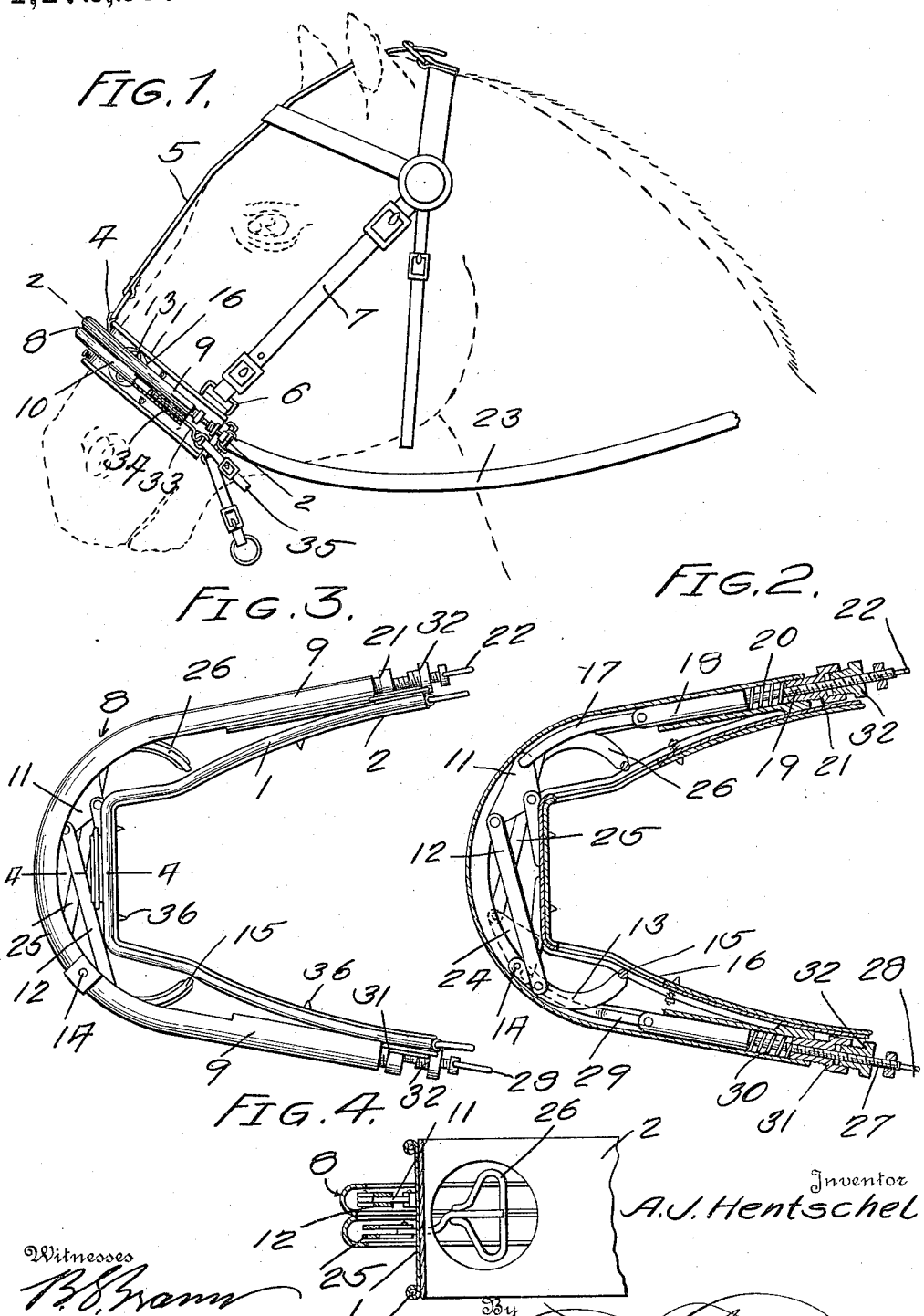

ANDREW J. HENTSCHEL, OF SCHULENBURG, TEXAS.

BRIDLE.

1,172,207.　　Specification of Letters Patent.　　Patented Feb. 15, 1916.

Application filed December 10, 1914. Serial No. 876,462.

*To all whom it may concern:*

Be it known that I, ANDREW J. HENTSCHEL, a citizen of the United States, residing at Schulenburg, in the county of Fayette, State of Texas, have invented certain new and useful Improvements in Bridles; and I do hereby declare the following to be a full, clear, and exact description of the invention, such as will enable others skilled in the art to which it appertains to make and use the same.

The present invention relates to bridles, and more particularly to a bridle wherein means for controlling and guiding the horse is provided.

The type follows that disclosed in my application #833,261 filed Apr. 20, 1914 and allowed Aug. 27, 1914.

An object of the invention resides in the provision of controlling means so that the horse may be either guided or prevented from running away, the latter provision being made because of the fact that the ordinary driving bit will not control an unruly horse.

A further object resides in the provision of means which will effectively prevent the horse from attempting to displace the device by rubbing it against an object.

A still further object lies in constructing the device in such manner that when a horse is being guided to turn to either the right or left the right or left rein, respectively, will be used.

With these and other objects in view, such as will appear as the description progresses, my invention comprises the combination and arrangement of parts as set forth in and falling within the scope of the appended claims.

Referring to the drawing: Figure 1 is a side elevation of my device, showing the same applied to a horse, the horse's head being shown in dotted lines. Fig. 2 is a section on line 2—2 of Fig. 1. Fig. 3 is a plan view of the device, the supporting strap being omitted. Fig. 4 is a section on line 4—4 of Fig. 3.

Referring to the drawing wherein like parts are indicated by like characters throughout the several views: The device consists of a rigid frame 1 which is of substantial U-shape and is constructed to fit the contour of a horse's nose. The inner face of this frame 1 is lined with soft material, such as felt or leather, which lining is indicated by the reference character 2. The upper and lower edges of this frame are turned over and strengthened by pieces of wire 3.

In order that the frame may be maintained in its proper position upon a horse, I have provided on the forward portion and on the upper edge of the frame, a loop, 4 to which the nose strap 5 is attached. On the rear ends of the frame, loops 6 are secured to which the cheek straps 7 are attached.

In order that pressure may be applied to the nostrils of a horse, I have secured to the ends of the frame 1 a U-shaped member 8 which extends around the frame and is slightly spaced from the outer face thereof. The forward portion of this member 8 is substantially W-shape in cross section, while the rear ends of the member terminate in superposed tubes 9 and 10. On the bight portion of the frame 1 is pivotally mounted adjacent the upper edge thereof a bell crank lever 11, to one arm of which is connected a link 12 which link extends transversely across the bight portion of the said frame and is secured to a pressure member 13 between the ends thereof, the said pressure member being pivoted to the member 8, at 14, and having a loop 15 on the other end thereof. This loop 15 normally lies in the space between the U-shaped member 8 and the outer face of the frame 1, but is constructed in such manner that it will be projected through an adjacent aperture 16 in the said frame 1. In order that the bell crank lever 11 may be actuated so that the said loop 15 will exert pressure on the horse's nostril, I have connected to the other arm of the bell crank lever a link 17 which has a head 18 pivoted to the other end thereof, the said head 18 being slidable within the tube 9 on the opposite side of the frame to that on which the loop 15 is located. Connected to this head is a rod 19 which extends through the said tube 9 and projects from the rear end thereof. Encircling this rod 19 is a coil spring 20 which bears against the head 18 at one end and against an adjustable sleeve 21 which is screw-threaded into the end of the tube 9 and through which the rod 19 passes. Adjustably secured on the end of the rod 19 is a line ring 22 to which the ordinary driving line or rein 23 is secured. A similar mechanism is used in applying pressure to the other nostril of the horse, the bell crank lever 24 being pivoted below the horizontal plane of the lever 11 and the link 25 extended to the opposite side of the frame 1 and connected to the pressure member 26. This pressure member is operated by a rod 27 similar to the rod 19 which rod has a line ring 28 adjustably secured to the end thereof and which is connected to the lever 24 by a rod 29 and is spring pressed inwardly by the coil spring 30 similar to the spring 20. A sleeve 31 is adjustably connected to the end of the tube 9 on the opposite side of the frame from the sleeve 21. In order that these rods 19 and 27 may be held rigidly to the frame 1 so that when the lines are pulled, the pressure members will not be operated, I have mounted, adjustably, on the rods 19 and 27, sleeves 32, which are externally threaded and are constructed to interengage with internal threads on the sleeves 21 and 31.

By the construction above described it will be seen that when force is applied to either of the rods 19 or 27 that the corresponding pressure member will be operated to apply pressure to the nostril of a horse so that he will be guided when the sleeves 32 are not engaged with the sleeves 21 and 31. However, when these sleeves 32 are engaged with the sleeves 21 and 31 when force is applied to either one or both of the lines the pressure members will not be actuated as will be seen from an inspection of the drawings. It will be further seen that by adjusting the sleeves 21 and 31 the tension of the springs 20 and 30 may be varied at will so that either a great or small pull on the driving lines will be required to operate the pressure members.

In order that the frame 1 will be resiliently held on the horse's nose, I have mounted rods 33 in the tubes 10, which rods are held inwardly by coil springs 34 and to the ends of which a chin piece 35 is secured, which encircles the chin of the horse in the usual manner.

In order that the horse may be prevented from rubbing the device against a stationary object and thus displacing the frame, I have mounted, resiliently, on the inner face of the frame 1 a plurality of members 36 which have prongs on the ends thereof, which prongs prick the flesh of the horse's nose when he attempts to displace the frame, but which yield when great pressure is applied thereto so that the horse will not be permanently injured.

It will be seen that I have provided a device by means of which a horse may be effectively guided under ordinary conditions and one which may be so adjusted that when force is applied to the reins the horse will be controlled should he assume an unruly attitude.

While I have illustrated and described a particular embodiment of my invention, I have merely done so for the sake of convenience and I do not wish to be limited to that particular embodiment as it is obvious that numerous changes may be made in the details of construction thereof without departing from the spirit of the invention or exceeding the scope of the appended claims.

What I claim is:—

1. In a bridle, a frame, levers pivoted to the said frame, pressure members connected to the levers and arranged to engage the nostrils of a horse, means connected to said pressure members for actuating the same, the said last mentioned means for each pressure member being located on the opposite side of the frame to the pressure member itself and means for rendering said operating means inoperative.

2. A bridle comprising a frame, a U-shaped member secured to the frame and in spaced relation thereto, pressure members pivotally mounted on the said U-shaped member, means on the said frame for actuating the said pressure members and means for rendering said actuating means inoperative.

3. In a bridle, a U-shaped frame having apertures on the opposite sides thereof; a U-shaped member secured to the said frame at the ends thereof and in spaced relation to the outer face of said frame, pressure members pivotally mounted on the said U-shaped member and constructed and arranged to normally lie in the space between the frame and the U-shaped member, means for actuating said pressure members, resilient means tending to prevent said actuation, means to vary the tension of said resilient means and means to prevent the actuation of the said actuating means.

In testimony whereof, I affix my signature, in the presence of two witnesses.

ANDREW J. HENTSCHEL.

Witnesses:
Louis Motal,
Johan F. Malsha.

Copies of this patent may be obtained for five cents each, by addressing the "Commissioner of Patents, Washington, D. C."